(12) United States Patent
Borges Oliveira et al.

(10) Patent No.: US 11,267,128 B2
(45) Date of Patent: Mar. 8, 2022

(54) ONLINE UTILITY-DRIVEN SPATIALLY-REFERENCED DATA COLLECTOR FOR CLASSIFICATION

(71) Applicant: International Business Machines Corporation, Armonk, NY (US)

(72) Inventors: Dario Augusto Borges Oliveira, Sao Paulo (BR); Andrea Britto Mattos Lima, Sao Paulo (BR); Priscilla Barreira Avegliano, Sao Paulo (BR); Carlos Henrique Cardonha, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 16/406,626

(22) Filed: May 8, 2019

(65) Prior Publication Data

US 2020/0353622 A1 Nov. 12, 2020

(51) Int. Cl.
*B25J 9/00* (2006.01)
*B25J 9/16* (2006.01)
*G06K 9/62* (2022.01)

(52) U.S. Cl.
CPC .......... *B25J 9/1697* (2013.01); *B25J 9/1664* (2013.01); *G06K 9/6215* (2013.01); *G06K 9/6267* (2013.01)

(58) Field of Classification Search
CPC ..... B25J 9/1697; B25J 9/1664; G06K 9/6215; G06K 9/6267; G06K 9/6256; G06K 9/6271; G06K 9/00664; G01C 21/20
See application file for complete search history.

(56) References Cited

U.S. PATENT DOCUMENTS

| | | | |
|---|---|---|---|
| 5,548,516 | A | 8/1996 | Gudat et al. |
| 6,917,893 | B2 | 7/2005 | Dietsch et al. |
| 7,155,336 | B2 | 12/2006 | Dorfman et al. |
| 8,260,485 | B1 | 9/2012 | Meuth et al. |
| 8,341,223 | B1 | 12/2012 | Patton et al. |

(Continued)

OTHER PUBLICATIONS

Cabreira, T , et al., "Survey on Coverage Path Planning with Unmanned Aerial Vehicles", Drones 2019, Accepted Dec. 29, 2018; Published Jan. 3, 2019, 38 pages, vol. 3, No. 1, Article No. 4.

(Continued)

*Primary Examiner* — Ian Jen
(74) *Attorney, Agent, or Firm* — Scully, Scott, Murphy & Presser, P.C.; Joseph Petrokaitis (57) ABSTRACT

Data associated with a region, acquired by a robot may be passed to a previously trained classifier. The classifier outputs a classification label L, and a confidence score C. Responsive to determining that the confidence score C is below a threshold T, the acquired data can be added to a training data set associated with the classifier, and the classifier retrained using the training data set which include at least information from the acquired data. Responsive to determining that the confidence score C is below the threshold T, at least one candidate region having characteristic similarity to the region can be identified. Responsive to determining that the confidence score C is not below the threshold T, at least one candidate region having a different characteristic from the region can be identified. The robot may be caused to acquire data associated with the candidate region.

20 Claims, 7 Drawing Sheets

(56) References Cited

U.S. PATENT DOCUMENTS

| | | |
|---|---|---|
| 9,454,157 B1 | 9/2016 | Hafeez et al. |
| 9,454,907 B2 | 9/2016 | Hafeez et al. |
| 9,988,781 B2 | 6/2018 | Pickover et al. |
| 10,081,426 B2 | 9/2018 | Gordon et al. |
| 10,123,674 B2 | 11/2018 | Gordon et al. |
| 10,272,566 B2 * | 4/2019 | Wellman .............. B65G 1/0492 |
| 2006/0104494 A1 | 5/2006 | Collins et al. |
| 2010/0226582 A1 | 9/2010 | Luo et al. |
| 2013/0011083 A1 | 1/2013 | Berkovich et al. |
| 2014/0316614 A1 | 10/2014 | Newman |
| 2015/0363717 A1 | 12/2015 | Lim |
| 2016/0018224 A1 | 1/2016 | Isler et al. |
| 2017/0162060 A1 | 6/2017 | Boland et al. |
| 2019/0126484 A1 * | 5/2019 | Benaim .................. G06F 3/015 |

OTHER PUBLICATIONS

Vivaldini, K.C.T, et al., "Route planning for active classification with UAVs", 2016 IEEE International Conference on Robotics and Automation (ICRA), May 16-21, 2016, pp. 2563-2568.

Ding, H., et al., "Fast Algorithms for UAV Tasking and Routing", 2016 IEEE Conference on Control Applications CCA), Part of 2016 IEEE Multi-Conference on Systems and Control, Sep. 19-22, 2016, pp. 368-373.

Davis, B., et al., "C-OPT: Coverage-Aware Trajectory Optimization Under Uncertainty", IEEE Robotics and Automation Letters, Jul. 2016, pp. 1020-1027, vol. 1, No. 2.

Koperski, K., et al., "An Efficient Two-Step Method for Classification of Spatial Data", https://pdfs.semanticscholar.org/b0fc/8eb015deca917c3d30eec2fb2e86457d0b33.pdf, Accessed on May 8, 2019, 10 pages.

Steels, L., "Cooperation Between Distributed Agents Through Self-Organisation", IEEE International Workshop on Towards a New Frontier of Applications, IROS '90, Aug. 1990, 7 pages.

Gedik, B., et al., "ASAP: An Adaptive Sampling Approach to Data Collection in Sensor Networks", IEEE Transactions an Parallel and Distributed Systems, Dec. 2007, pp. 1766-1783, vol. 18, No. 12.

* cited by examiner

ONLINE UTILITY-DRIVEN SPATIALLY-REFERENCED DATA COLLECTOR FOR CLASSIFICATION

BACKGROUND

The present application relates generally to computers and computer applications, and more particularly to machine learning and training datasets.

Machine learning systems rely on availability and diversity of data in order to train accurate models. Some of the challenges associated with the construction of training sets include unbalanced databases and small amount of available data where the amount of data available may be insufficient for all categories. In unbalanced databases, some categories may be under-represented in the dataset, thus impacting the accuracy of their classification. New or open problem can also pose a challenge. For instance, if a problem is new or if a new category is discovered, lack of balance and insufficiency of data set can emerge. Approaches such as brute force approaches for navigating in a physical environment with the goal of collecting comprehensive datasets may be expensive and ineffective, and the marginal gains such approaches may bring to a relatively incomplete dataset may be minimal.

BRIEF SUMMARY

A system, in one aspect, can include a hardware processor. A memory can be coupled to the hardware processor. The hardware processor may be operable to pass data acquired by a robot to a previously trained classifier. The classifier can output a classification label L, and a confidence score C, the data associated with a region. Responsive to determining that the confidence score C is below a threshold T, the hardware processor may be further operable to add the acquired data to a training data set associated with the classifier, and retrain the classifier using the training data set which includes at least information from the acquired data. Responsive to determining that the confidence score C is below the threshold T, the hardware processor may be further operable to identify at least one candidate region having characteristic similarity to the region, the characteristic similarity determined based on meeting a criterion. Responsive to determining that the confidence score C is not below the threshold T, the hardware processor may be further operable to identify at least one candidate region having a different characteristic from the region. In one aspect, additional data acquired from said at least one candidate region can be used to retrain the classifier.

A computer-implemented method, in one aspect, may include passing data acquired by a robot to a previously trained classifier, the classifier outputting a classification label L, and a confidence score C, the data associated with a region. The method may also include, responsive to determining that the confidence score C is below a threshold T, adding the acquired data to a training data set associated with the classifier, and retraining the classifier using the training data set which includes at least information from the acquired data. The method may further include, responsive to determining that the confidence score C is below the threshold T, identifying at least one candidate region having characteristic similarity to the region, the characteristic similarity determined based on meeting a criterion. The method may also include, responsive to determining that the confidence score C is not below the threshold T, identifying at least one candidate region having a different characteristic from the region. In one aspect, additional data acquired from said at least one candidate region can be used to retrain the classifier.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method and technique are disclosed, which can provide one or more approaches to identifying, filling and/or mitigating a particular gap or gaps in training data sets. A system and method, for example, may target specific types of data in acquisition of data used as training data sets in training machine learning algorithms or models. In some embodiments, the system and method may organize, for example, in real time, data-collection expeditions made by automated devices such as unmanned aerial vehicles, terrestrial vehicles, or the like, where the identification of potentially new classes of objects triggers expeditions in other sufficiently similar localities, aiming at increasing the amount of data being collected about items of that category in different contextual settings.

In some embodiments, the system and method may compute or determine in real-time a navigation strategy of an automated data collector such as an unmanned aerial vehicle. The system and method in some embodiments drive a route optimization according to a continuous performance evaluation of a classifier or machine learning model, for example, with a goal of collecting relevant data. The system and method in some embodiments may use hyper-knowledge information to infer the regions where the relevant data is potentially located.

Figure 1:
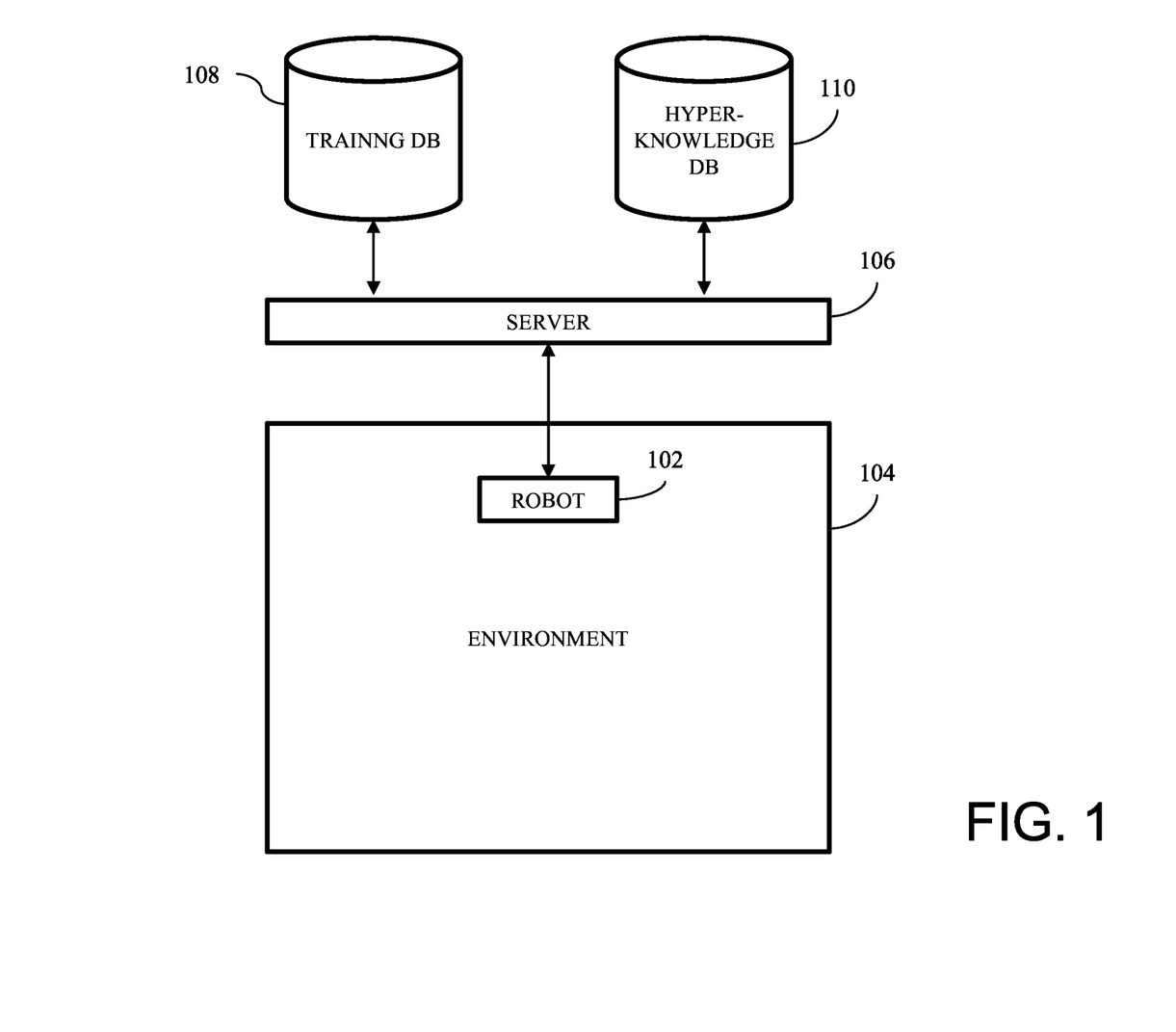
FIG. 1 is a diagram illustrating system components in one embodiment.

FIG. 1 is a diagram illustrating system components in one embodiment. A robot 102 can be any type of automated geo-located vehicle or device capable of collecting data (e.g., taking photographs). Examples include but are not limited to unmanned aerial vehicles or terrestrial vehicles. An unmanned aerial vehicle is also referred to as a drone. In another embodiment, the system disclosed herein can advise a vehicle manually driven by a user equipped with a device capable of collecting data and registering its current position or advise the user on a navigation strategy for collecting data. The navigation strategy can be an optimal or optimized navigation strategy.

Environment 104 can be any spatially-referenced location where the robot 102 can navigate for collecting samples. In some embodiments, the environment includes regions with heterogeneous characteristics, for example, different altitude, climate, soil characteristics, other geological characteristics, other geographical characteristics, and/or other characteristics.

A server 106 can be a location where the data is processed and the navigation route is computed, for example, a computer, computer system or server, which can process data and compute a navigation strategy or route. In one embodiment, the remote server 106 may be hosted as a cloud service. The server can include or execute on one or more hardware processors. The server 106 can be remotely located from the robot 102, for example, and may communicate via a network, for example, via a wireless communication, with the robot 102.

A database, e.g., a training database (DB) 108 can be a database containing training samples or data sets and algorithms for classification. In an embodiment, the training DB 108 can include a computer vision database for image classification and the training samples or data sets can include image data. Example methods used in performing image classification can include but are not limited to convolutional neural networks (CNNs). Such database can be stored on one or more storage devices.

In one embodiment, a model that is trained on training data set, for example, acquired by the robot, can be an artificial neural network model, also referred to as a neural network model. An embodiment of an implementation of an artificial neural network can include a succession of layers of neurons, which are interconnected so that output signals of neurons in one layer are weighted and transmitted to neurons in the next layer. A neuron Ni in a given layer may be connected to one or more neurons Nj in the next layer, and different weights wij can be associated with each neuron-neuron connection Ni–Nj for weighting signals transmitted from Ni to Nj. A neuron Nj generates output signals dependent on its accumulated inputs, and weighted signals can be propagated over successive layers of the network from an input to an output neuron layer. An artificial neural network machine learning model can undergo a training phase in which the sets of weights associated with respective neuron layers are determined. The network is exposed to a set of training data, in an iterative training scheme in which the weights are repeatedly updated as the network "learns" from the training data. The resulting trained model, with weights defined via the training operation, can be applied to perform a task based on new data.

A convolutional neural network (CNN) is a type of an artificial neural network, a deep neural network. A CNN can be used to analyze visual images. In CNN, input data (for example, training data set, which can include vectors of image pixels) applied filters or kernels in one or more convolution layers, to learn features. A CNN can also include one or more local or global pooling layers, for instance, to reduce the dimension of the data. Data from the convolution and pooling layers are flattened and passed through fully connect layers for learning to classify images.

A hyper-knowledge database (DB) 110 can be database that contains methods and access to services that allow deriving contextual information of a region given a spatially-referenced location. In an embodiment, a method to access a service may be a third party service, e.g., a weather forecast service which can be provided by a third party. Examples of contextual information include but are not limited to: weather, climate, geological information, geographical position. Such database can be stored on one or more storage devices. The contextual information may be derived by the location of the robot, for example, acquired via a global positioning system (GPS) or another location system. For instance, given the coordinates of the robot, the system can use one or more internal and/or external services and databases to check the weather, altitude and/or geological information of the given location.

Figure 2:
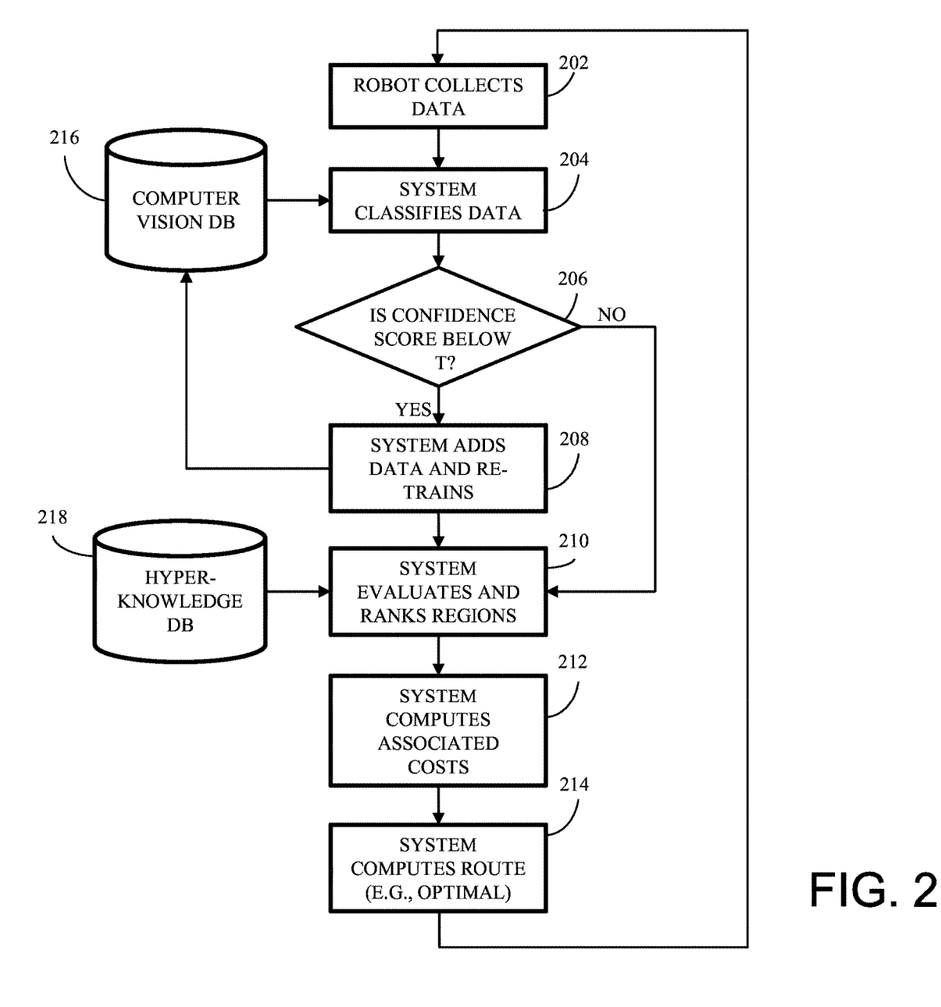
FIG. 2 is a flow diagram illustrating a method in one embodiment.

FIG. 2 is a flow diagram illustrating a method in one embodiment. The method may be performed or executed by one or more hardware processors. For example, a computer system may include one or more hardware processors, which can perform the present method. The method may include receiving data acquired by a robot such as an unmanned aerial vehicle or another vehicle (e.g., autonomous vehicle), which may capture data associated with an area or region (e.g., spatial or geographical area). For example, at 202, a robot may acquire data and send data to a remote server or another computer. The remote server receiving the data can include the computer processor running the present method. In another aspect, the remote server may be another computer, which may communicate the data from the robot to a computer processor running the present method. The data can include one or more images, which may serve as input for a classifier, and the geo-location of the robot, which can be used for acquiring contextual information regarding the robot location. The geo-location can be determined using a location system such as global positioning system.

At 204, using a classifier that has a known classification accuracy (denoted by $A_1$), the system classifies the acquired data. The result of the classification includes the classification label L and the confidence score C. The classifier, for example, is a previously trained machine learning model with known accuracy for classifying an item of classification label L. For example, the acquired data can be passed in forward propagation to a neural network model, which is trained to classify the data.

At 206, the system checks whether the confidence score is below a previously defined threshold T. The value of T may be defined by the user or configured automatically by the system. Low confidence scores for the input data may indicate that the system does not contain enough training samples for L. Low confidence scores can also be indicative of data acquisition conditions, for example, that the image is taken under a new condition.

At 208, if the confidence score is below the threshold T, the system adds the collected data (e.g., acquired by the robot as in 202) to the training dataset, for example, stored in a computer vision database 216. For example, a new training data set can be composed, using the acquired data in addition to the existing training data used previously to train the classifier. For instance, the new training data set includes information from the acquired data and old training data set. Then, the system trains (or retrains) and evaluates the classifier with the new data (new training data set), by computing a new classifier accuracy (denoted by $A_2$). The method proceeds to 210.

For example, a neural network such as the convolutional neural network can (CNN) can provide classifier accuracy, which is related to the model. The accuracy value can be problem-dependent and related to the loss function for the training optimization problem considered. In an embodiment of a classification task, the loss function can be a least-squared mean error or alike mapped into a sigmoid function or alike, which delivers likelihood values between 0 and 1. The classifier accuracy can be related to how well a classifier (e.g., CNN model) correctly classifies a whole training dataset.

The "confidence score", which can also be provided by a neural network such as the CNN is related to the data being classified. In an embodiment, the confidence score can also use one or more variables other than the accuracies computed by the classifier, and can be computed as how good a set of variables for a given prediction fits the distribution of values of a given class of samples. Generally, the confidence score refers to a score that indicates the level of confidence in the prediction of the given data collected. The confidence score or level can express the level of certainty a classifier (e.g., a CNN model) provides for each classification of each sample in the training dataset.

If at 206, the system determines that the confidence score is not below the threshold T, the logic of the method proceeds to 210.

At 210, the system uses hyper-knowledge stored in a hyper-knowledge database 218 to evaluate which regions are potentially interesting for the robot to visit next, given the geo-location of the robot and the confidence score C. The hyper-knowledge database 218 can contain information (and/or methods or services to access such information) about different regions, for example, contextual information such as geographical location information (e.g., longitude/latitude, area size) and their characteristics such as climate, altitude, soil condition, other geological information, and/or other contextual information.

In some embodiments, if the confidence level of classification, C, is high (e.g., not below the threshold T), the robot needs not collect additional data of class L. Therefore, the robot can be directed to visit one or more regions with different characteristics than the current region, for instance, since it is likely that those regions with different characteristics contain different input samples. In this scenario, the system can rank the regions by dissimilarity to the current region. For example, the system may identify at least one candidate region having a different characteristic from that of the region. Whether a characteristic is different may be determined based on meeting a criterion, for example, a threshold distance between the values of a characteristic of the region and the candidate region. Differences in a combination of characteristics can be considered. Another criterion may be used to determine the difference. Identified candidate regions (if more than one) can be ranked from most similar to least similar.

If the confidence level of classification is low (e.g., below the threshold T), the robot can be directed to collect more of the similar data as collected in the current region. Therefore, the robot can be controlled or directed to visit one or more regions with similar characteristics, since it is likely that those regions contain more samples for L. In this scenario, the system can rank the regions by similarity to the current region. For example, the system may identify at least one candidate region having characteristic similarity to the region. The characteristic similarity may be determined based on meeting a criterion, for example, a threshold distance between the values of a characteristic of the region and the candidate region. Similarities in a combination of characteristics can be considered. Another criterion may be used to determine similarity. Identified candidate regions (if more than one) can be ranked from most similar to least similar.

At 212, the system computes the cost of visiting each candidate region. The associated cost takes into account one or more of factors such as distance, battery and/or fuel level of the robot, and/or other factors, which may contribute to cost. A simple example of computing the cost can include, but not limited to, computing the distance needed to travel to the candidate region by the robot considering the amount of fuel or battery power needed (including travel distance needed to refuel or recharge).

At 214, the system uses the associated costs and the values of $A_1$ and $A_2$ (if computed at 208) to compute a navigation route for the robot. In one embodiment, the route is optimized to be an optimal route. For example, even if there is a high cost in visiting a region R, if the region is determined to contain samples for L, and the new data increases the classifier accuracy substantially (e.g., increases the confidence score at 208, e.g., $A_2$ is higher than $A_1$ following a threshold value), the system can determine that it may be interesting to visit R, despite the high cost. The routing problem can be formulated as a variant of the traveling salesman problem. The problem is to find, in an undirected graph with weights on the edges, a cycle that includes all the vertices the sum of whose edge weights is a minimum. In an example implementation, vertices can represent locations (e.g., regions or even sub-regions in a region), edges can indicate paths connecting pairs of locations, and edge weights can represent the cost associated with the robot navigation; cost may represent fuel consumption, travel time, distance, etc. By comparing the resulting cost with the expected utility from the newly acquired information, the user can decide whether the exploration of the region is economically interesting. The routing problem can also be formulated as a variant of the vehicle routing problem in case two or more robots are used to collect the data. Such problems can be satisfactorily solved with one or more algorithms based on mathematical programming or with heuristics (e.g., Lin-Kerninghan local-search heuristic).

The system may cause the robot to acquire data associated with one or more candidate regions. For example, the computed navigation route can be sent to the robot to control the robot's route. The robot can be directed or controlled to navigate the route.

Figure 3:
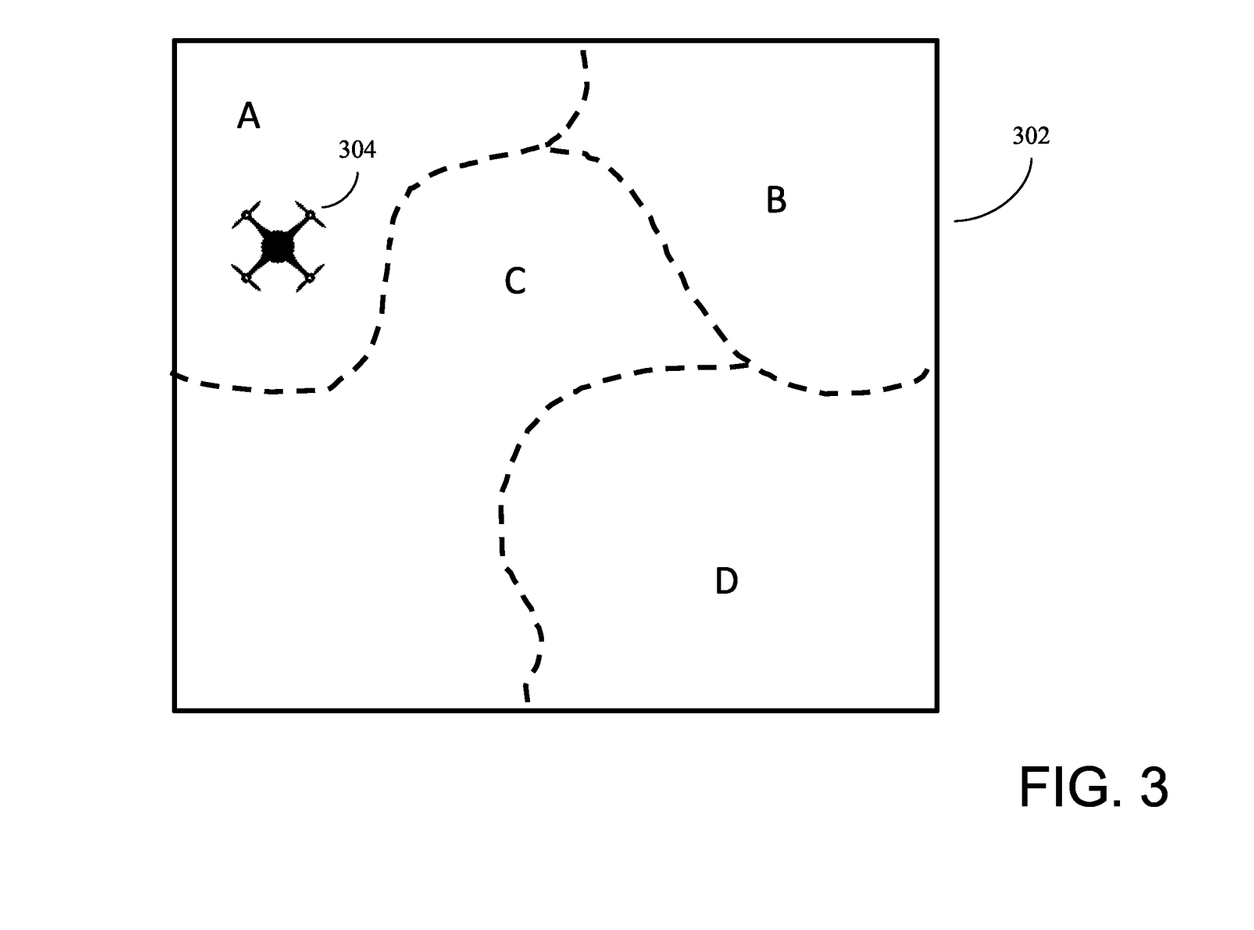
FIG. 3 is a diagram illustrating example regions a robot can be directed to visit in one embodiment.

FIG. 3 is a diagram illustrating example regions a robot can be directed to visit in one embodiment. For example, environment 302 with heterogeneous regions A, B, C, D is shown. Consider a machine learning system, which is to train a machine learning model or algorithm, so as to be able to solve a task. An example task is crop identification or classification. Consider that region A is similar to region B in its characteristics (e.g., climate, altitude, soil). Region C and region D have different characteristics from region A. Region C and region D have similar characteristics. An unmanned aerial vehicle 304 captures geolocated data, for example, images of region A. If the captured data associated with region A is determined to be useful, for example, increases or improves classifier accuracy, the system can determine that region A and region B should be explored for acquiring training data for the classifier. If the captured data is not useful, the system can determine that the unmanned aerial vehicle 304 explore region C and region D. The system may also take into account the cost of the unmanned aerial vehicle 304 traveling to different regions, in determining which regions to explore.

Figure 4:
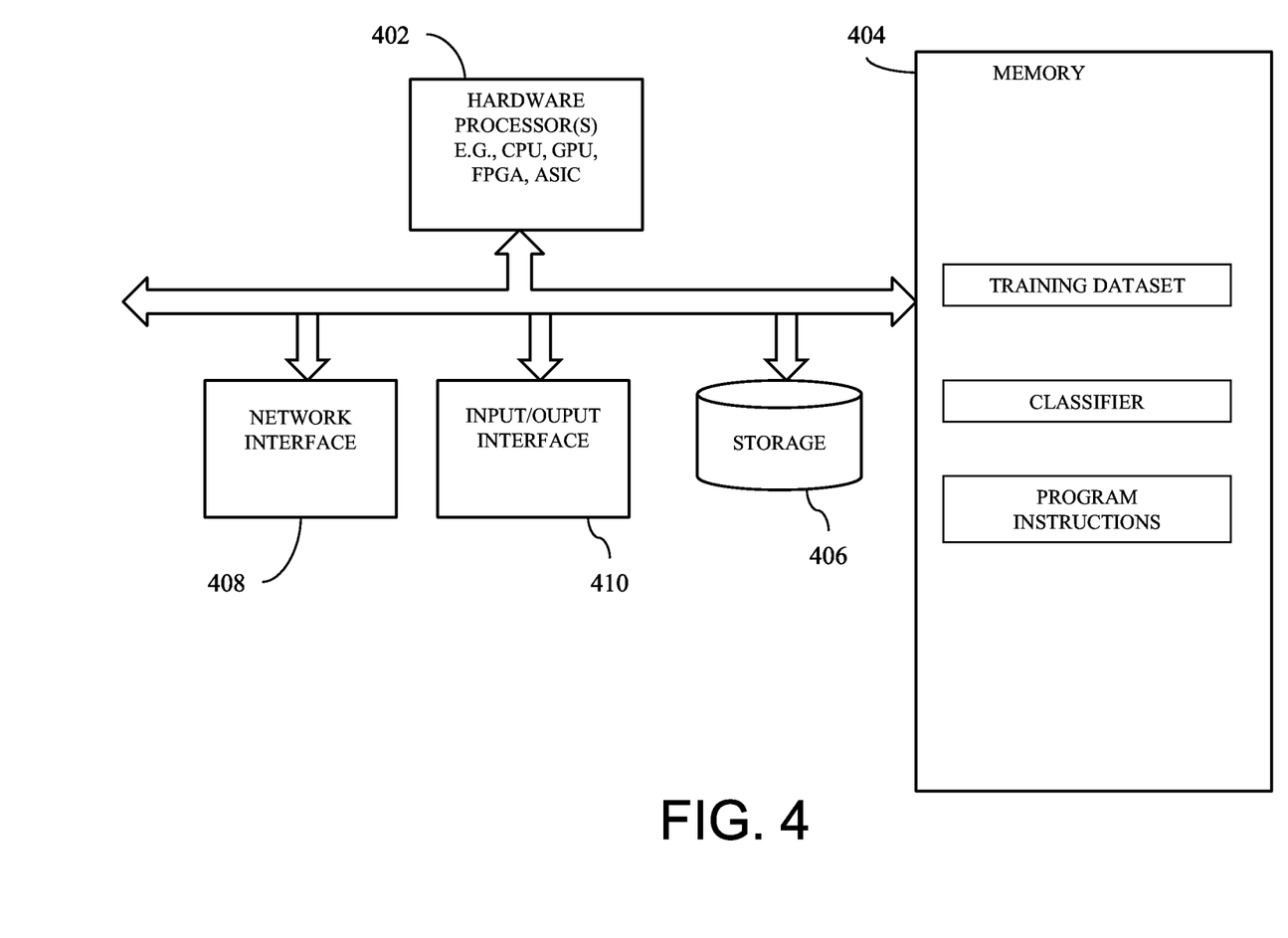
FIG. 4 is a diagram showing components of a system in one embodiment, which can compose training data sets for machine learning.

FIG. 4 is a diagram showing components of a system in one embodiment, which can compose training data sets for machine learning, for instance, for improving prediction or detection accuracy of a classifier or machine learning model.

One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and generate a prediction model and recommend communication opportunities. A memory device 404 may include random access memory (RAM), read-only memory (ROM) or another memory device, and may store data and/or processor instructions for implementing various functionalities associated with the methods and/or systems described herein. One or more processors 402 may execute computer instructions stored in memory 404 or received from another computer device or medium. A memory device 404 may, for example, store instructions and/or data for functioning of one or more hardware processors 402, and may include an operating system and other program of instructions and/or data. One or more hardware processors 402 may receive input comprising acquired data associated with a region, for example, acquired by a robot such as an unmanned aerial vehicle or another automatic vehicle capable of capturing data associated with its environment, such as image data of a region. At least one hardware processor 402 may pass the acquired data to a previously trained classifier, which may output a classification label and a confidence score. Training data set associated with the classifier may be stored in a storage device 406 or received via a network interface 408 from a remote device, and may be temporarily loaded into a memory device 404 for training or retraining the classifier. The classifier may be stored on a memory device 404, for example, for execution by one or more hardware processors 402. Based on the output classification label's confidence score, one or more hardware processors 402 may identify one or more candidate regions from which new data can be obtained. One or more hardware processors 402 may also compute a navigation route or strategy for a robot to travel and capture data. One or more hardware processors 402 may be coupled with interface devices such as a network interface 408 for communicating with remote systems, for example, via a network, and an input/output interface 410 for communicating with input and/or output devices such as a keyboard, mouse, display, and/or others.

A system and/or method in an embodiment uses classification accuracy of a deep neural network or another machine learning algorithm, to estimate which kind of sample is more valuable from the informational point of view, and adds the sample to the training data set determined to be valuable. The system and/or method in an embodiment may rely on using a hyper-knowledge base to estimate potential candidate regions for exploration. Evaluating the information gain of each sample can improve the deep neural network or another machine learning algorithm's accuracy. Evaluating the information gain of each sample or set of samples can include adding samples to a training data set and performing a training process.

The system and/or method in an embodiment can optimize a route for capturing valuable information to increase the accuracy of a machine learning algorithm, for example, the classification accuracy of a deep neural network. The system and/or method in an embodiment can gain insight about the relevance or importance of a sample (e.g., a new sample) in the classification process or another machine learning process. In one aspect, classes or types of samples that improve the machine learning algorithm, for example the deep neural network classification algorithm, can be considered as movable objective, for instance, since the samples can be captured from various candidate regions.

The route or route plan can be optimized based on determined value of samples in an area in improving the machine learning algorithm, and thus the utility of a location associated with valued set of samples can be identified.

The system and/or method in an embodiment can explore contextual similarities between regions to improve a machine learning algorithm by enriching a training data set with potentially relevant data. The system and/or method in an embodiment can also assess utilities and contextual similarities between regions, defined according to the regions' potential contribution to training data sets for machine learning algorithms.

Figure 5:
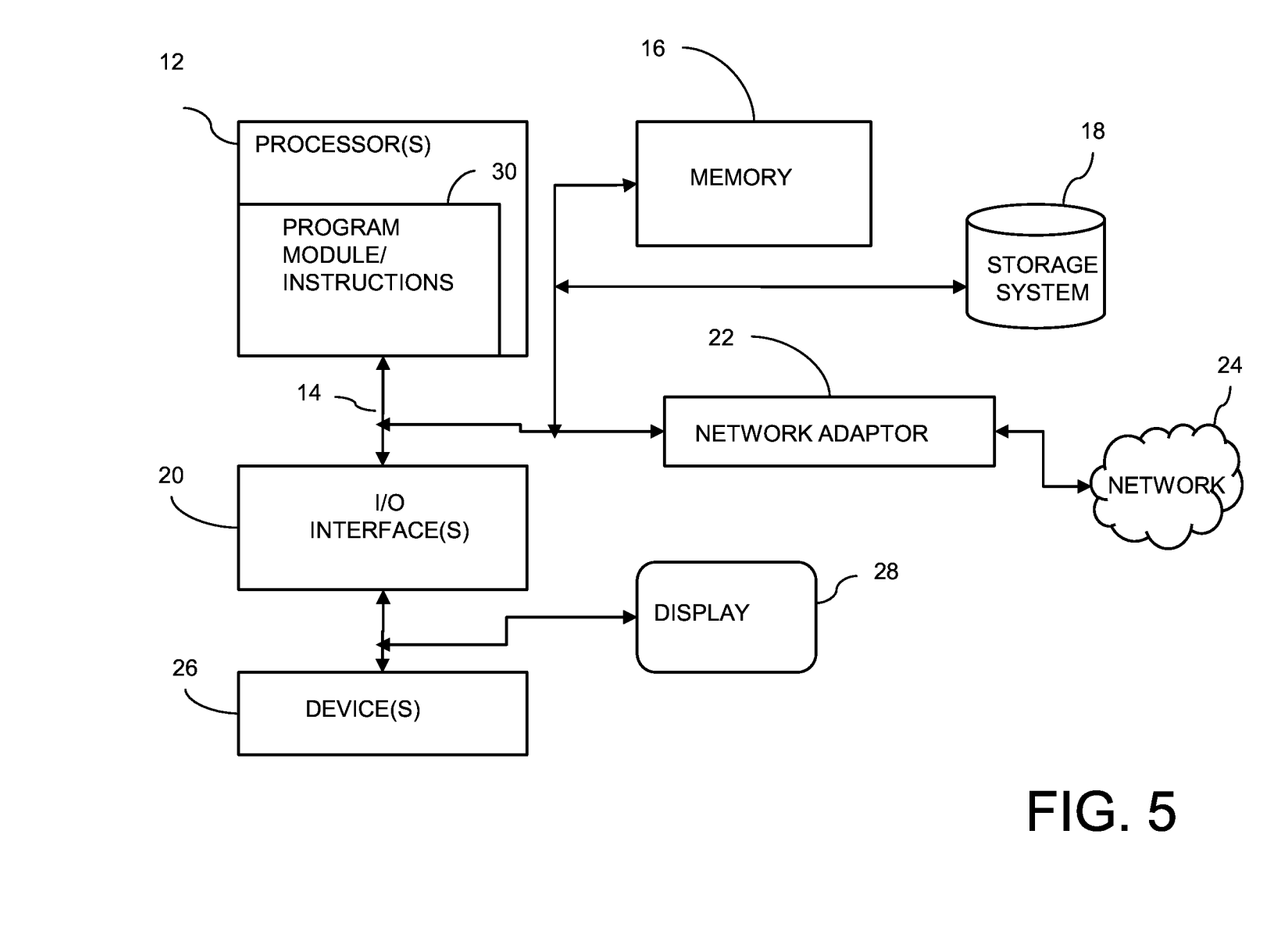
FIG. 5 illustrates a schematic of an example computer or processing system that may implement a system in one embodiment.

FIG. 5 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
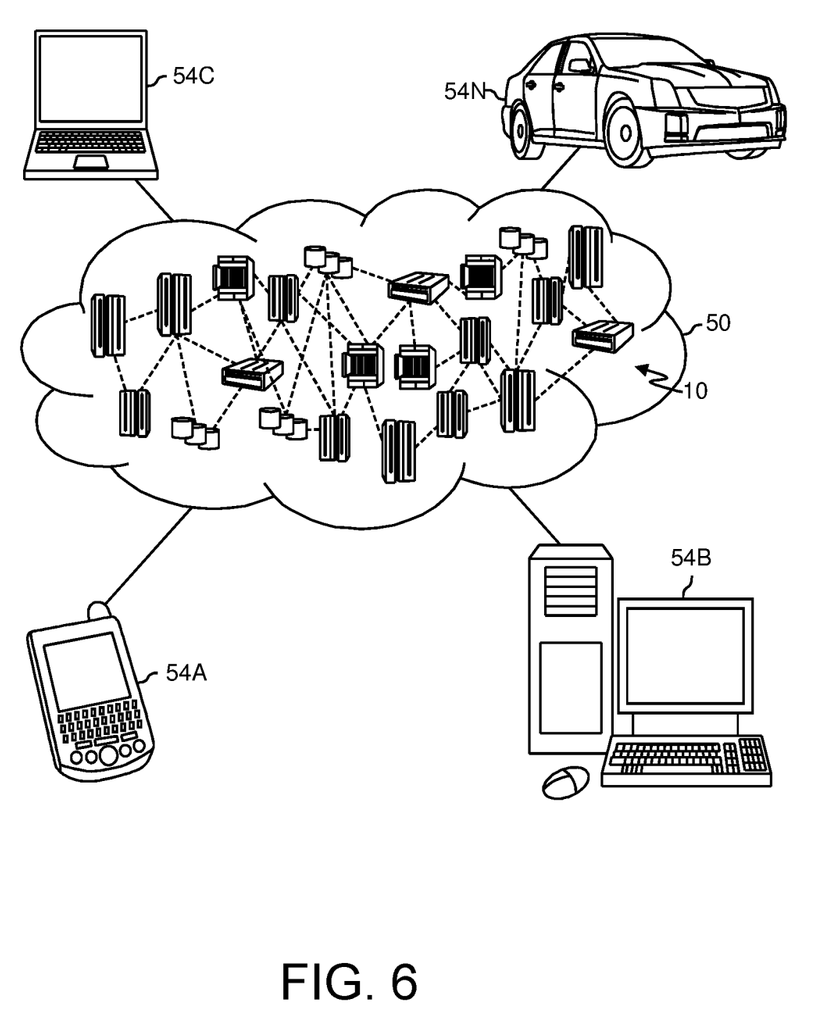
FIG. 6 illustrates a cloud computing environment in one embodiment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
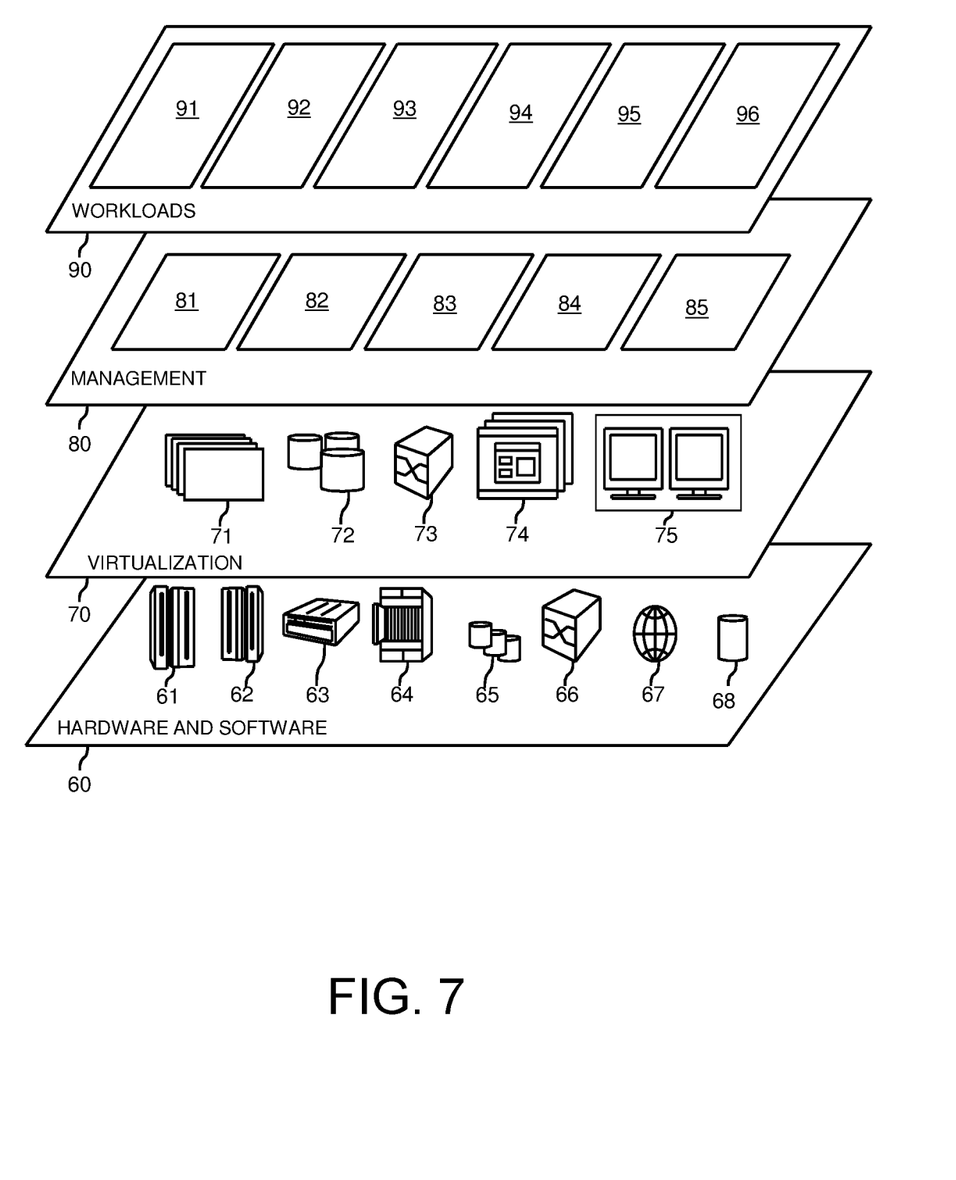
FIG. 7 illustrates a set of functional abstraction layers provided by cloud computing environment in one embodiment.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and spatially-referenced data collection for classification processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Embodiments of the present invention can be freely combined with each other if they are not mutually exclusive.

What is claimed is:

1. A system comprising:
    a hardware processor;
    a memory coupled to the hardware processor;
    the hardware processor operable to at least:
        pass data acquired by a robot to a classifier, the classifier outputting a classification label L, and a confidence score C, the data associated with a region;
        responsive to determining that the confidence score C is below a threshold T, add the acquired data to a training data set associated with the classifier, and retrain the classifier using the training data set, wherein the training data set includes at least information from the acquired data;
        responsive to determining that the confidence score C is below the threshold T, identify at least one candidate region having characteristic similarity to the region, the characteristic similarity determined based on meeting a criterion;
        responsive to determining that the confidence score C is not below the threshold T, identify at least one candidate region having a different characteristic from the region,
        wherein additional data acquired from said at least one candidate region can be used to retrain the classifier.

2. The system of claim 1, wherein the hardware processor is further operable to cause the robot to acquire data associated with the candidate region.

3. The system of claim 1, wherein said at least one candidate region comprises a plurality of candidate regions and the hardware processor is further operable to compute a navigation route including at least some of the plurality of candidate regions.

4. The system of claim 1, wherein said at least one candidate region comprises a plurality of candidate regions and the hardware processor is further operable to rank the plurality of candidate regions by similarity to the region.

5. The system of claim 1, wherein said at least one candidate region comprises a plurality of candidate regions and the hardware processor is further operable to rank the plurality of candidate regions by differences to the region.

6. The system of claim 1, wherein the data associated with the candidate region is further added to the training data set for further retraining the classifier.

7. The system of claim 1, wherein the data acquired by the robot includes at least image data.

8. The system of claim 3, wherein the navigation route is computed to optimize at least a cost of travelling to the candidate regions.

9. A computer program product comprising a non-transitory computer readable storage medium having program instructions embodied therewith, the program instructions executable by a device to cause the device to:
pass data acquired by a robot to a classifier, the classifier outputting a classification label L, and a confidence score C, the data associated with a region;
responsive to determining that the confidence score C is below a threshold T, add the acquired data to a training data set associated with the classifier, and retrain the classifier using the training data set, wherein the training data set includes at least information from the acquired data;
responsive to determining that the confidence score C is below the threshold T, identify at least one candidate region having characteristic similarity to the region, the characteristic similarity determined based on meeting a criterion;
responsive to determining that the confidence score C is not below the threshold T, identify at least one candidate region having a different characteristic from the region,
wherein additional data acquired from said at least one candidate region can be used to retrain the classifier.

10. The computer program product of claim 8, wherein the device is further caused to cause the robot to acquire data associated with the candidate region.

11. The computer program product of claim 8, wherein said at least one candidate region comprises a plurality of candidate regions and the device is further caused to compute a navigation route including at least some of the plurality of candidate regions.

12. The computer program product of claim 8, wherein said at least one candidate region comprises a plurality of candidate regions and the device is further caused to rank the plurality of candidate regions by similarity to the region, responsive to determining that the confidence score C is below a threshold T.

13. The computer program product of claim 8, wherein said at least one candidate region comprises a plurality of candidate regions and the device is further caused to rank the plurality of candidate regions by differences to the region, responsive to determining that the confidence score C is not below the threshold T.

14. The computer program product of claim 8, wherein the data associated with the candidate region is further added to the training data set for further retraining the classifier.

15. The computer program product of claim 8, wherein the data acquired by the robot includes at least image data.

16. The computer program product of claim 11, wherein the navigation route is computed to optimize at least a cost of travelling to the candidate regions.

17. A computer-implemented method comprising:
passing data acquired by a robot to a classifier, the classifier outputting a classification label L, and a confidence score C, the data associated with a region;
responsive to determining that the confidence score C is below a threshold T, adding the acquired data to a training data set associated with the classifier, and retraining the classifier using the training data set, wherein the training data set includes at least information from the acquired data;
responsive to determining that the confidence score C is below the threshold T, identifying at least one candidate region having characteristic similarity to the region, the characteristic similarity determined based on meeting a criterion;
responsive to determining that the confidence score C is not below the threshold T, identifying at least one candidate region having a different characteristic from the region,
wherein additional data acquired from said at least one candidate region can be used to retrain the classifier.

18. The computer-implemented method of claim 17, further comprising causing the robot to acquire data associated with the candidate region.

19. The computer-implemented method of claim 17, wherein said at least one candidate region comprises a plurality of candidate regions, and the method further comprises computing a navigation route including at least some of the plurality of candidate regions.

20. The computer-implemented method of claim 17, wherein said at least one candidate region comprises a plurality of candidate regions and the method further comprises ranking the plurality of candidate regions by similarity to the region.

* * * * *